United States Patent [19]

Gedye

[11] Patent Number: 5,425,141
[45] Date of Patent: Jun. 13, 1995

[54] MANAGING DISPLAY WINDOWS OF INTER-RELATED APPLICATIONS USING HOLLOWED WINDOWS

[75] Inventor: David Gedye, San Francisco, Calif.

[73] Assignee: Sun Microsystems, Inc., Mountain View, Calif.

[21] Appl. No.: 216,115

[22] Filed: Mar. 21, 1994

Related U.S. Application Data

[63] Continuation of Ser. No. 809,952, Dec. 18, 1991, abandoned.

[51] Int. Cl.⁶ .............................................. G09G 1/00
[52] U.S. Cl. .................................... 395/157; 395/155
[58] Field of Search ............... 395/153, 155, 157, 158, 395/159, 161

[56] References Cited

U.S. PATENT DOCUMENTS

| 4,868,765 | 9/1989 | Diefendorff | 395/157 X |
| 5,043,919 | 8/1991 | Callaway et al. | 395/162 |

OTHER PUBLICATIONS

Patent Abstracts of Japan, vol. 15, No. 158 (p-1193) 19 Apr. 1991 & JP-A-03 029 023 (Shimadzu Corp.) 7 Feb. 1991.
Research disclosure, Jul. 1990, No. 31527, Emsworth, GB, XP134138, "Translucent window".

*Primary Examiner*—Heather R. Herndon
*Assistant Examiner*—Cliff Nguyen Vo
*Attorney, Agent, or Firm*—Blakely Sokoloff Taylor & Zafman

[57] ABSTRACT

In a computer controlled display system, a CPU is provided for generating a foreground and at least one background display windows on a display for a controlling and at least one subordinating programs. The foreground display window is generated selectively with or without a portion of the foreground display window hollowed out. The at least one background display window is generated for display behind the hollowable portion of the foreground display window, rendering the visibility and accessibility of the at least one background display window dependent on the foreground display window. A display coupled to the CPU is provided to display the generated display windows. An input device is provided to provide one of the controlling and the at least one subordinate programs with an input. The CPU is used to process the input by at least one of the controlling and the at least one subordinating programs, and regenerate the display windows for display selectively reflecting the processing. As a result, the controlling and the at least one subordinate programs may be used repeatedly and cooperatively by a user thereby improving the usability of these programs.

16 Claims, 4 Drawing Sheets

MANAGING DISPLAY WINDOWS OF INTER-RELATED APPLICATIONS USING HOLLOWED WINDOWS

This is a continuation of application Ser. No. 07/809,952, filed Dec. 18, 1991, now abandoned.

BACKGROUND OF THE INVENTION

1. Field of the Invention

The present invention relates to the field of computer systems, in particular, computer systems that utilize direct manipulated graphical user interfaces and display windows. More specifically, the present invention relates to managing large display windows of interrelated programs on these computer systems.

2. Background

Today, many computer systems utilize one of a variety of direct manipulation graphical user interfaces in which many previously coded programming commands are replaced by graphic images, or icons, on a computer display. These graphic images, or icons, symbolically represent a variety of objects or operations the computer system will execute if the graphic images, or icons, are chosen. A user interacts with the computer by choosing and manipulating these graphic images, or icons.

Additionally, many graphical user interfaces utilize multiple display windows displayed on the computer display for the applications to convey information to a user. The information is presented in a combination of text and graphics in these display windows. A display window may be rectangular or non-rectangular in shape, such as polygonal or curved. A display window may have one or more areas of the display window that are absent, i.e., hollowed areas, whereby a user can see through the display window. The display windows may occupy different areas of the display screen, i.e. disjointed, or "stacked" on top of each other, i.e. intersecting. The "top" display window is fully visible. Other display windows may be visible, partially visible, or invisible depending on their intersection with the "top" display window, and each other.

A user is permitted to operate on and manipulate the display window contents, and the display window itself, as if the image constituted an actual object. The user may delete information from a display window, move data from one display window to another, and generally operate on the display window as if an actual file in an office is being used. Often, the source display window of an operation has to be the "top" display window thereby ensuring that the display window of current interest is fully visible and accessible for interaction.

For further description of graphical user interfaces, see, D. Robson, "Object Oriented Software System", BYTE, August 1981, p. 74, Vol. 6, No. 8; and L. Tesler, "The Small Talk Environment", BYTE, August 1981, p. 90, Vol. 6, No. 8. See also, U.S. Pat. No. Re. 32,632, reissued Mar. 29, 1988, and assigned to Apple Computer, Inc.; U.S. patent application Ser. No. 07/323,774, filed Mar. 15, 1989 and its corresponding Division and Continuation Applications, Ser. Nos. 07/458,596 and 07/619,665, filed Dec. 26, 1989 and Nov. 28, 1990 respectively, and assigned to the assignee of the subject application, Sun Microsystems, Inc; and U.S. patent application Ser. No. 07/746,328, filed Aug. 15, 1991, also assigned to the assignee of the subject application.

For further description of specific implementations of graphical user interfaces, for example, OPEN WINDOWS, by Sun Microsystems, Inc., or others by manufacturers such as International Business Machines, and Apple Computer, Inc., the reader is directed to technical literature provided by these companies.

With current display window organizations, problems can arise when a user needs to work on two interrelated applications at the same time. If the display windows representing the applications are small, then the user can sometimes place them side and side on the display screen. More often however, the display windows are so large that there is not enough room for them on the display screen without overlapping. The user who is forced to work like this spends a lot of time "popping" windows back and forth. Additionally, the relationship is often not represented to the user, even though there are times that it is beneficial for the user to be aware of the relationship between the two applications.

Thus, it is desirable to provide a computer controlled display system and a method to manage display windows of interrelated applications on the display system in a manner that improves the usability of the interrelated applications. In particular, it is desirable for the method to accommodate large display windows used by the interrelated applications. It is also desirable for the method to represent the relationship to the user. As will be disclosed, the present invention provides a computer controlled display system and a method incorporated on the display system for managing display windows of interrelated applications that achieves the desired results.

SUMMARY OF THE INVENTION

A computer controlled display system and a method incorporated on the display system for managing display windows of interrelated applications is disclosed, which has particular application to computer controlled display systems that employ direct manipulation user interfaces. Under the present invention, a CPU coupled to a display is provided for generating and displaying a foreground display window and at least one background display window on the display for a controlling and at least one subordinate application respectively. The foreground display window is generated and displayed selectively with or without a portion of the foreground display window hollowed out. The at least one background display window is generated and displayed behind the hollowable portion of the foreground display window, rendering the visibility and accessibility of the at least one background display window to be dependent on the foreground display window.

Input is received from the user for the controlling and at least one subordinate program through the foreground and the at least one background display window. A received input is processed by at least one of the controlling and the at least one subordinate program. The processing if performed by the controlling program is conditionally augmented by the at least one subordinate program at the control of the controlling program. The processing if performed by the at least one subordinate program is conditionally intervened by the controlling program at the control of the controlling program.

As a result, the relationship between the two interrelated programs is represented to the user, and the two interrelated programs may be used repeatedly and cooperatively without requiring any popping of their display windows, thereby improving the usability of the two interrelated programs.

BRIEF DESCRIPTION OF THE DRAWINGS

The objects, features, and advantages of the present invention will be apparent from the following detailed description of the preferred embodiment of the invention with references to the drawings in which.

NOTATIONS AND NOMENCLATURE

Figure 1:
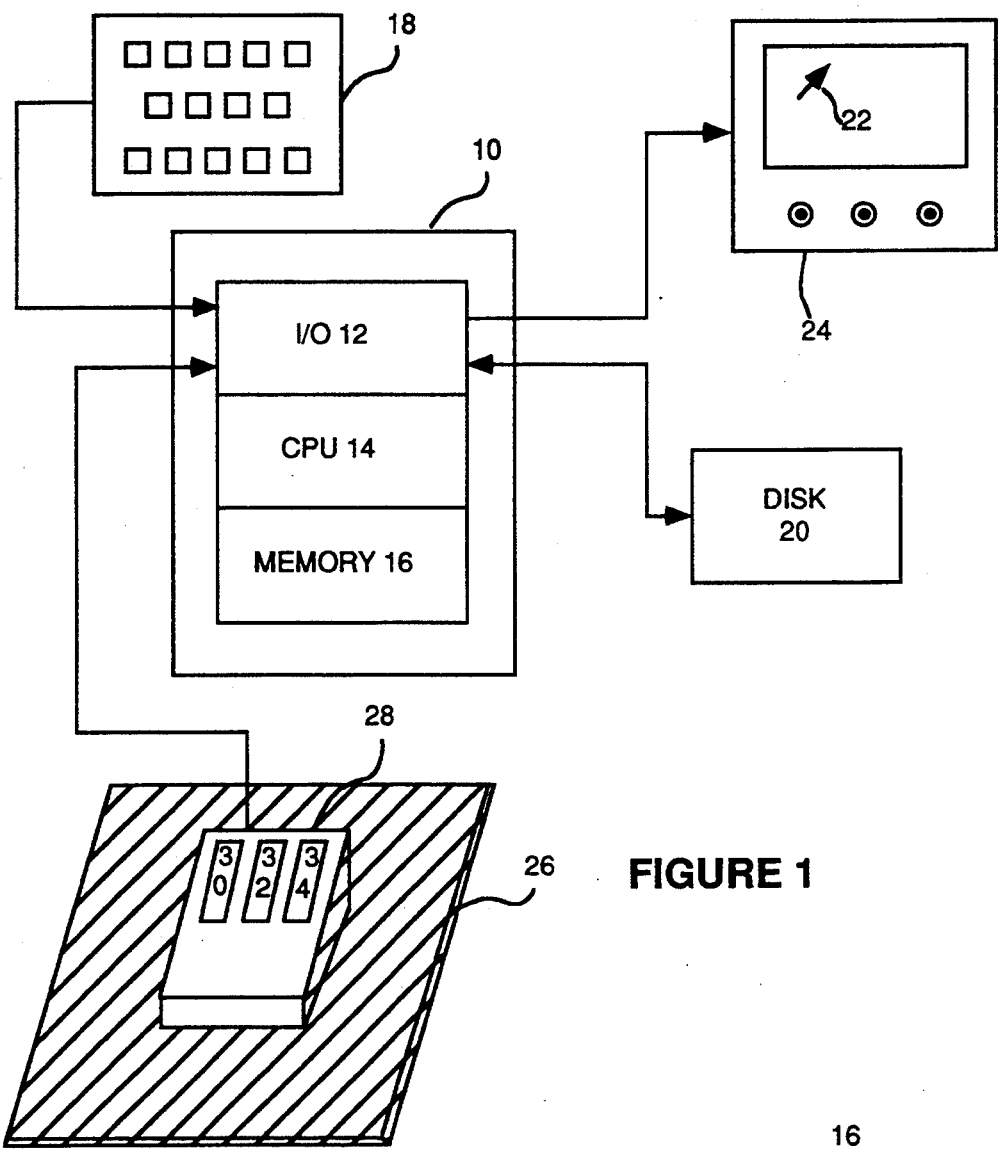
FIG. 1 shows a physical view of the hardware elements of a computer system that incorporates the teachings of the present invention.

The detailed description which follows is presented largely in terms of program procedures executed on a network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those that require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, objects, characters, terms, numbers, or the like. It should be borne in mind, however, that all these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operation described herein which form part of the present invention; the operations are machine operations. Useful machines for performing the operations of the present invention include general purpose digital computers or other similar devices. In all cases, it should be borne in mind the distinction between the method operations in operating a computer and the method of computation itself. The present invention relates to method steps for operating a computer in processing electrical or other physical signals to generate other desired physical signals.

The present invention also relates to apparatus for performing these operations. This apparatus may be specially constructed for the required purposes or it may comprise a general purpose computer as selectively activated or re-configured by a computer program stored in the computer. The procedures presented herein are not entirely related to any particular computer or other apparatus. In particular, various general purpose machines may be used with procedures written in accordance with the teaching herein, or it may prove more convenient to construct more specialized apparatus to perform the required method steps. The required structure for a variety of these machines will appear from the description given below.

DETAILED DESCRIPTION OF THE PREFERRED EMBODIMENT

A computer controlled display system and a method incorporated in the display system for managing display windows of interrelated applications is disclosed, which has particular application to display system that employ direct manipulated user interface. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Referring now to FIG. 1, an exemplary computer based system for generating graphic images and responding to a user's input in accordance with the teachings of the present invention is illustrated. Shown is a computer 10 comprised of three major components. The first of these is an input/output (I/O) circuit 12 which is used to communicate information in appropriately structured form to and from other portions of the computer 10. In addition, the computer 10 includes a central processing unit (CPU) 14 coupled to the I/O circuit 12 and a memory 16. These elements are those typically found in most general purpose computers, and, in fact, the computer 10 is intended to be representative of a broad category of computer systems.

A magnetic disk 20 is shown coupled to the I/O circuit 12 to provide additional storage capability for the computer 10. It will be appreciated that additional devices may be coupled to the computer 10 for storing data such as magnetic tape drives, as well as networks which are in turn coupled to other computer systems. As is well known, the disk 20 may store other computer programs, characters, routines, etc., which may be accessed and executed by the CPU 14.

A raster display monitor 24 is shown coupled to the I/O circuit 12 and is used to display images generated by the CPU 14 in accordance to the teachings of the present invention. Any well known variety of raster (or pix-mapped) display may be utilized as display 24. A keyboard 18 is shown coupled to the I/O circuit 12 and is used to input data and commands into the computer 10, as is well known. A cursor control device 28 is also shown coupled to the computer 10 through the I/O circuit 12. The cursor control device 28 (commonly known as a "mouse") permits a user to select various command modes, modify graphic data, and input other data. More particularly, the cursor control device 28 permits a user to selectively position a cursor 22 at any desired location on the display 24 by movement of the cursor control device 28 over a surface 26. The cursor control device 28 also permits the user to provide the CPU 14 with various signals using the switches 30-34 on the cursor control device 28. Any well known variety of cursor control device, such as optical mice, mechanical mice, track balls and joy sticks, may be utilized for the cursor control device 28.

Figure 2:
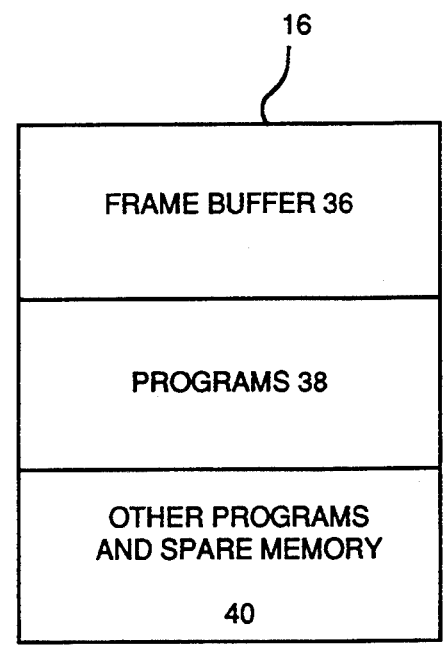
FIG. 2 shows one arrangement of program storage of the computer system illustrated in FIG. 1.

Referring now to FIG. 2, one arrangement of major programs contained within the memory 16 illustrated in FIG. 1 is shown. In particular, there is shown a frame buffer 36, which serves as a pixel map of the display 24. The frame buffer 36 represents the video memory for the display 24, wherein, each storage location in the frame buffer 36 corresponds to a pixel on the display 24. Thus, the frame buffer can be accessed as a two dimensional array of points having known coordinates corresponding to the pixels on the raster display 24. The memory 16 also comprises a variety of programs implemented per the teaching of the present invention 38, as disclosed in this specification, for execution by the CPU 10. Additionally, the memory 16 further comprises other programs for controlling or performing other well known functions and operation on computer systems.

Figure 3A:
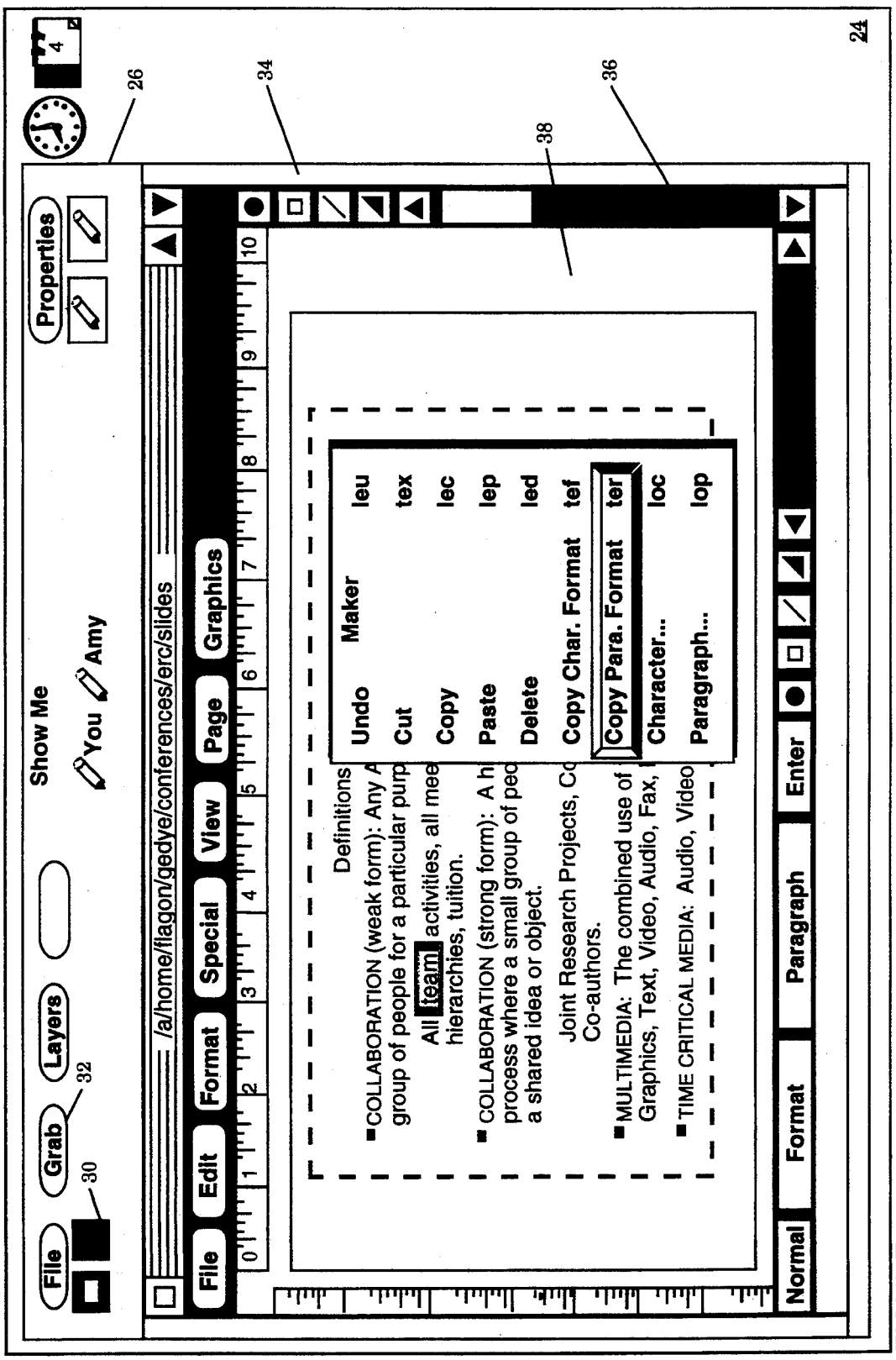
FIGS. 3a-3b illustrate the present invention for managing display windows on the computer system illustrated in FIG. 1 using an exemplary scenario involving two exemplary interrelated applications.
Figure 3B:
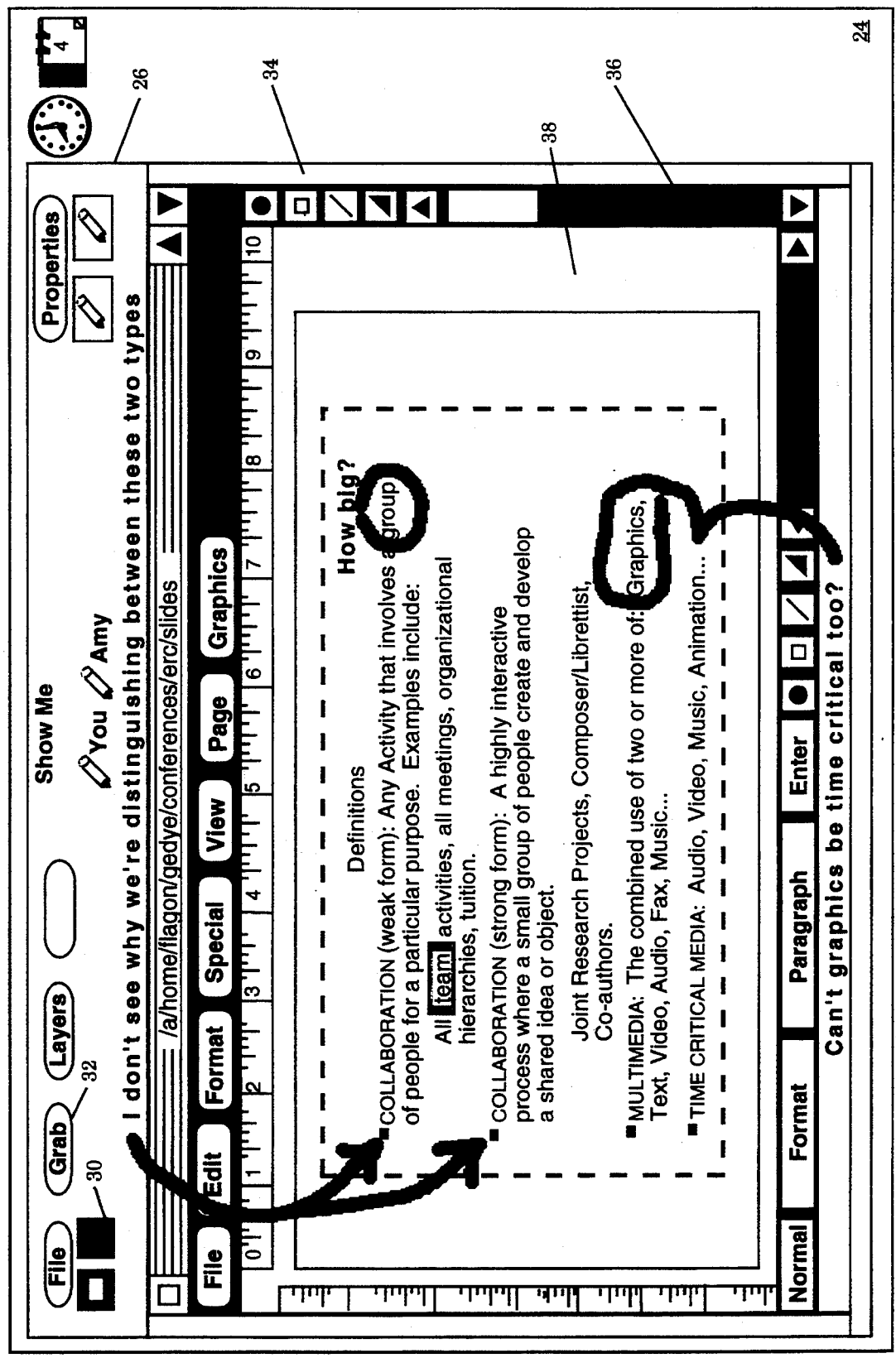

Referring now to FIGS. 3a–3b, the present invention for managing display windows for interrelated applications on the computer system illustrated in FIG. 1 is illustrated. The present invention is illustrated with an exemplary scenario involving two exemplary interrelated applications, a desktop publishing application and a multi-person sketching and mark up application. Under this exemplary scenario, the user uses the desktop publishing application to create a number of presentation slides, and then uses the mark up application to share and work on the slides with a number of collaborators at the same time. The mark-up application displays the slide currently being worked on, on a number of displays simultaneously for the collaborators. The displays may be coupled to the same computer system or to other coupled computer systems.

Shown in FIG. 3a is a mark up display window 26 generated and displayed on the computer controlled display 24 for the mark up application by the CPU with its window data pane 34 hollowed out, whereas shown in FIG. 3b is the mark up display window 26 generated and displayed on the computer controlled display 24 for the mark up application by the CPU without its window data pane 34 hollowed out. The mark up display window 26 is generated as a foreground display window occupying most of the display screen 24. The mark up display window 26 comprises the hollowable window data pane 34. The mark up display window 26 is selectively generated with or without the window data pane 34 hollowed out. As a result, visibility and accessibility of images generated behind the hollowable window data pane 34 is dependent on how the mark up display window 26 is generated and displayed, that is the images generated behind the hollowable window data pane 34 is visible and accessible as illustrated in FIG. 3a, but invisible and inaccessible as illustrated in FIG. 3b.

Although the mark up display window 26 and the desktop publishing display window 36 are illustrated in FIGS. 3a and 3b with large display windows, each occupying a substantial portion of the display screen 24, it will be appreciated that the present invention also applies to smaller display windows. Similarly, although the mark up display window 26 is illustrated in FIGS. 3a and 3b with the entire window data pane 34 being hollowable, it will be appreciated that the present invention may be practiced with only a portion of the window data pane of the foreground display window being hollowable.

Also shown in FIG. 3a is a desktop publishing display window 36 generated and displayed on the computer controlled display 24 for the desktop application by the CPU. The desktop publishing display window 36 as illustrated in FIG. 3a is visible and accessible to the user since the foreground mark up display window 26 is generated and displayed with its window data pane 34 hollowed out, whereas the desktop publishing display window is not illustrated in FIG. 3b since the foreground mark up display window 26 is generated and displayed without its window data pane 34 hollowed out, rendering the desktop publishing window invisible and inaccessible to the user. The desktop publishing display window 36 is generated as a background display window occupying most of the display screen 24 used by the hollowable window data pane 34 of the mark up display window 26. The desktop publishing display window 36 also comprises a window data pane 38.

Continuing to refer to FIGS. 3a and 3b, the mark up application and the desktop publishing application are used cooperatively by the user. The desktop publishing window 36 is used by the user to edit a file. The mark up display window 26 is used by the user to share an image with other users of the mark up application (FIG. 3a). The shared image is captured from the desktop publishing display window 36, and displayed in the window data pane 34 when it is restored to the unhollowed state (FIG. 3b). The mark up application, in response to an user request, and with the cooperation of the desktop publishing application, performs the capturing of the shared image from the desktop publishing window 36, restoring the window data pane 34 to the unhollowed state, and displaying the captured image on the unhollowed window data pane 34.

The exemplary mark up and desktop publishing applications are intended to represent a broad category of interrelated applications that relate to each other in a controlling and subordinating manner. The exemplary image capturing cooperation between the two exemplary applications are intended to represent a broad category of cooperations between these controlling and subordinating application. Particular examples include the controlling application intervening in the processing of the subordinating application, the controlling application accessing the data of the subordinating application, and the subordinating application providing augmenting processing for the controlling application.

Still referring to FIGS. 3a and 3b, inputs are received from the user through the mark up display window 26 and through the desktop publishing window 36. Inputs are received from either one of the display windows 26 or 36, when the mark up display window 26 is generated with the window data pane 34 hollowed out (FIG. 3a), whereas inputs are received from the mark up display window 26 only when the mark up display window 26 is generated without the window data pane 34 hollowed out (FIG. 3b). Inputs are either received through the unhollowed window data panes 34 or 38, or through the selection of icons, e.g. 30, 32.

In particular, the mark up display window 26 further comprises an icon 30 for an user to provide the mark up application with a request to hollow out or to restore the window data pane 34. The selection of the icon when the window data pane 34 is hollowed out (FIG. 3a) indicates the user's desire to have the mark up display window regenerated and redisplayed without the window display data pane 34 hollowed out, whereas the selection of the icon when the window data pane 34 is not hollowed out (FIG. 3b) indicates the user's desire to have the mark up display window regenerated and redisplayed with the window display data pane 34 hollowed out. Although the icon 30 is illustrated with certain particular form and location, it will be appreciated that it may be presented in other forms and positioned in other locations on the display window 26. In fact, the icon 30 is intended to represent a broad category of iconic as well as non-iconic mechanism for indicating user desired action which are well known in the art.

Additionally, the mark up display window 26 further comprises another icon 32 for the user to provide the mark up application with the request to capture an image of the desktop publishing display window 36 (enabled in FIG. 3a, disabled in FIG. 3b) and display the captured image in the unhollowed window data pane 34 (FIG. 3b). The selection of the icon 32 when the mark up display window 26 is displayed with the window data pane 34 hollowed out (FIG. 3a) implies the mark up display window 26 is to be regenerated and redisplayed without the display window data pane hollowed out (FIG. 3b). Similarly, although the icon 32 is illustrated with certain particular form and location, it will be appreciated that it may be presented in other forms and positioned in other locations on the display window 26. In fact, the icon 32 is intended to represent a broad category of iconic as well as non-iconic mechanism for indicating user desired action which are well known in the art.

Although only the desktop publishing display window 36 is illustrated in FIGS. 3a and 3b as being displayed behind the hollowable window data pane 34 of the mark up display window 26, it will be appreciated that a number of intersecting or non-intersecting display windows for a number of subordinating applications to the controlling application may be displayed as background display windows behind the hollowable portion of the foreground display window of the controlling application.

Figure 4:
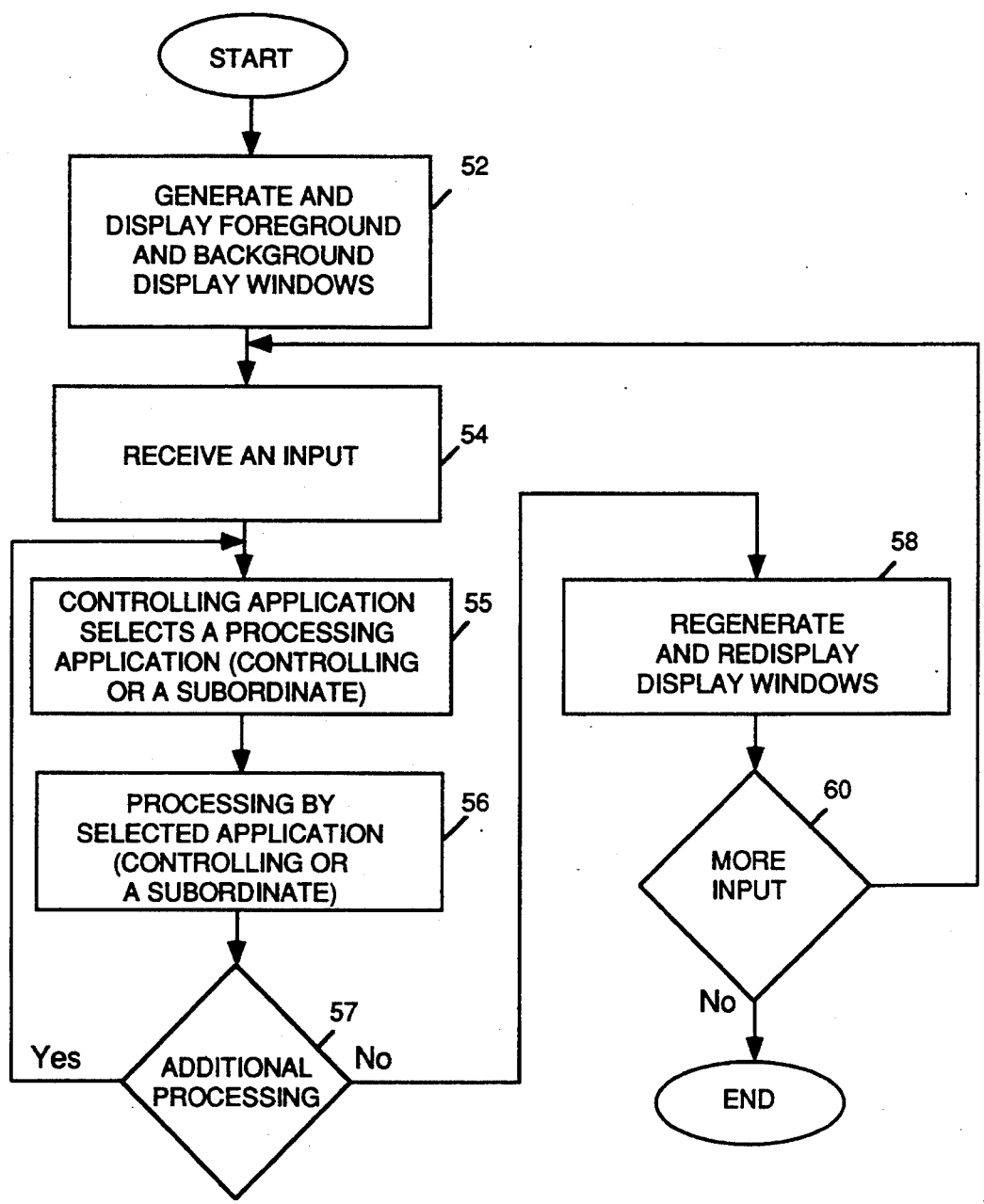
FIG. 4 is a flow chart of the method of the present invention for managing display windows for interrelated applications.

Referring now to FIG. 4, a block diagram illustrating the operation flow of the method of the present invention for managing display windows of interrelated applications is shown. Initially, a foreground and at least one background display window is generated by the CPU and displayed on the display for a controlling application and at least one subordinating application respectively, block 52. As described earlier, the foreground display window is generated and displayed selectively with or without a portion of the foreground display window hollowed out, and the at least one background display window is generated and displayed behind the hollowable portion of foreground display window.

Then, an input is received from the user through either the foreground or one of the at least one background display window, block 54. As described earlier, the input is received from the foreground display window if the foreground display window is displayed without a portion of itself hollowed out, and the input is received from either the foreground or one of the at least one background display window if the foreground display window is displayed with a portion of itself hollowed out.

Upon receipt of the input, the input causes processing to be performed by at least one of the controlling and the at least one subordinate application, blocks 55, 56 and 57. The controlling application first selects itself or one of the at least one subordinated application to process the received input, block 55. Upon completion of the processing by the selected application, block 56, the controlling application determines if additional processing is required, block 57. If additional processing is required, blocks 55 and 56 are repeated. Blocks 55, 56 and 57 are repeated until all required processing are performed.

Upon completion of all required processing, the foreground and background display windows are regenerated and redisplayed conditionally reflecting the processing performed, block 58. The process steps, blocks 54–58, are repeated for additional user inputs.

While the present invention has been described using an exemplary scenario involving two exemplary interrelated applications, those skilled in the art will recognize that the invention is not limited to the exemplary scenario and applications used. The computer controlled display system and the method incorporated therein of the present invention can be practiced with modification and alteration within the spirit and scope of the appended claims. The description is thus to be regarded as illustrative instead of restrictive on the present invention.

What is claimed is:

1. In a computer system comprising a display coupled to a central processing unit (CPU) executing a plurality of programs on behalf of a user, wherein a plurality of display windows are displayed on said display by said CPU for said programs, a method for managing said display windows for a controlling program and at least one subordinating program that enhances the usability of said controlling program and said at least one subordinating program, said method comprising the steps of:

a) generating and displaying a foreground display window and at least one background display window on said display by said CPU for said controlling program and said at least one subordinating program respectively, said foreground display window being generated and displayed selectively with or without a portion of said foreground display window hollowed out in accordance to user interactions with said foreground display window and without requiring any user interaction with said at least one background display window, said at least one background display window being generated and displayed behind said hollowable portion of foreground display window rendering said at least one background display window's visibility and accessibility to said user dependent on said foreground display window;

b) receiving an input from said user through a selected one of said foreground display window and said at least one background display window;

c) processing said received input by at least a selected one of said controlling program and said at least one subordinating program under the control of said controlling program; and d) regenerating and redisplaying said foreground display window and said at least one background display window selectively reflecting said processing;

whereby allowing repetitive and cooperative interactions with said controlling program and said at least one subordinating program through said foreground display window and said at least one background display window thereby enhancing the usability of said controlling program and said at least one subordinating program.

2. The method as set forth in claim 1, wherein, said input is received in said step b) by said controlling program when said foreground display window is generated and displayed with said hollowable portion of said foreground display window hollowed out;

said received input is processed in said step c) by said controlling program;

said foreground display window is regenerated and redisplayed in said step d) with said hollowable portion of said foreground display window unhollowed.

3. The method as set forth in claim 1, wherein, said input is received in said step b) by said controlling program when said foreground display window is generated and displayed with said hollowable portion of said foreground display window unhollowed;

said received input is processed in said step c) by said controlling program; and said foreground display window is regenerated and redisplayed in said step d) with said hollowable portion of said foreground display window hollowed out.

4. The method as set forth in claim 1, wherein, said input is received in said step b) by said controlling program;

said processing in said step c) comprises capturing an image of said at least one background display window;

said foreground display window is regenerated and redisplayed in said step d) with said hollowable portion of said foreground display window unhollowed, and said captured image.

5. The method as set forth in claim 4, wherein, said controlling program is a multi-user application program;

said unhollowed foreground display window with said captured image is also generated and displayed simultaneously on at least one other display for at least one other user.

6. The method as set forth in claim 5, wherein, said at least one other display is coupled to said CPU.

7. The method as set forth in claim 5, wherein, said at least one other display is coupled to at least one other computer system, said at least one other computer system being coupled to said computer system.

8. The method as set forth in claim 1, wherein, said foreground display window and said at least one background display window are large display windows occupying most of said display's display area.

9. A computer controlled display system comprising:

a) a central processing unit (CPU) for generating a foreground display window and at least one background display window for a controlling program and at least one subordinating program respectively, processing an input received from a selected one of said foreground display window and said at least one background display window by at least a selected one of said controlling program and said at least one subordinating program under the control of said controlling program, and regenerating said foreground display window and said at least one background display window selectively reflecting said processing, said foreground display window being selectively generated/regenerated with or without a portion of said foreground display window hollowed out in accordance to user interactions with said foreground display window and without requiring any user interaction with said at least one background display window, said at least one background display window being generated/regenerated for display behind said hollowable portion of said foreground display window rendering said at least one background display window's visibility and accessibility dependent in said foreground display window;

b) input means coupled to said CPU for providing said input; and c) display means coupled to said CPU comprising a display for displaying said foreground display window and said at least one background display window;

whereby allowing repetitive and cooperative interactions with said controlling program and said at least one subordinating program through said foreground display window and at least one background display window thereby enhancing the usability of said controlling program and said subordinating program.

10. The computer controlled display system as set forth in claim 9, wherein, said input means provides said input to said controlling program when said foreground display window is generated and displayed with said hollowable portion of said foreground display window hollowed out;

said CPU processes said input with said controlling program, and regenerates said foreground display window with said hollowable portion of said foreground display window unhollowed; and said display means displays said regenerated foreground display window.

11. The computer controlled display system as set forth in claim 9, wherein, said input means provides said input to said controlling program when said foreground display window is generated and displayed with said hollowable portion of said foreground display window unhollowed;

said CPU processes said input with said controlling program, and regenerates said foreground display window with said hollowable portion of said foreground display window hollowed out; and said display means displays said regenerated foreground display window.

12. The computer controlled display system as set forth in claim 9, wherein, said input means provides said input through said foreground display window;

said CPU processes said input, captures an image of said at least one background display window, and regenerates said foreground display window with said hollowable portion of said foreground display window unhollowed and said captured image; and said display means displays said regenerated foreground display window.

13. The computer controlled display system as set forth in claim 12, wherein, said controlling program is a multi-user application program;

said unhollowed foreground display window with said captured image is also generated and displayed simultaneously on at least one other display for at least one other user.

14. The computer controlled display system as set forth in claim 13, wherein, said computer controlled display system further comprises said at least one other display, said at least one other display being coupled to said CPU.

15. The computer controlled display system as set forth in claim 13, wherein, said computer controlled display system is coupled to at least one other computer system comprising said at least one other display.

16. The computer controlled display system as set forth in claim 9 wherein, said foreground display window and said at least one background display window are large display windows occupying most of said display's display area.

* * * * *